Feb. 6, 1968   H. HAGEN   3,367,212
AUTOMATIC HYDRAULIC TRANSMISSION
Filed Feb. 2, 1966   3 Sheets-Sheet 1

Henry Hagen
INVENTOR
BY
Oliver D. Olson
Agent

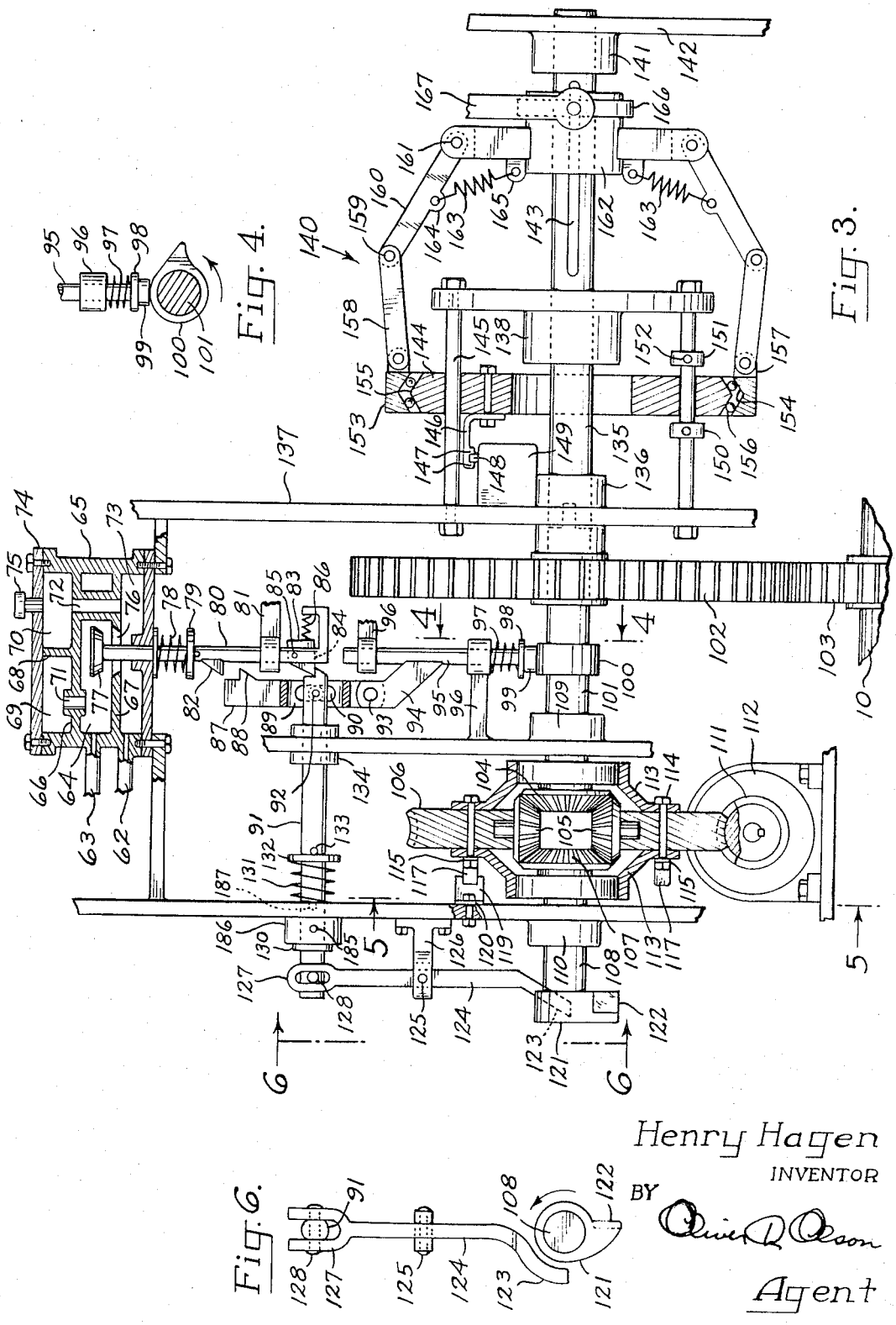

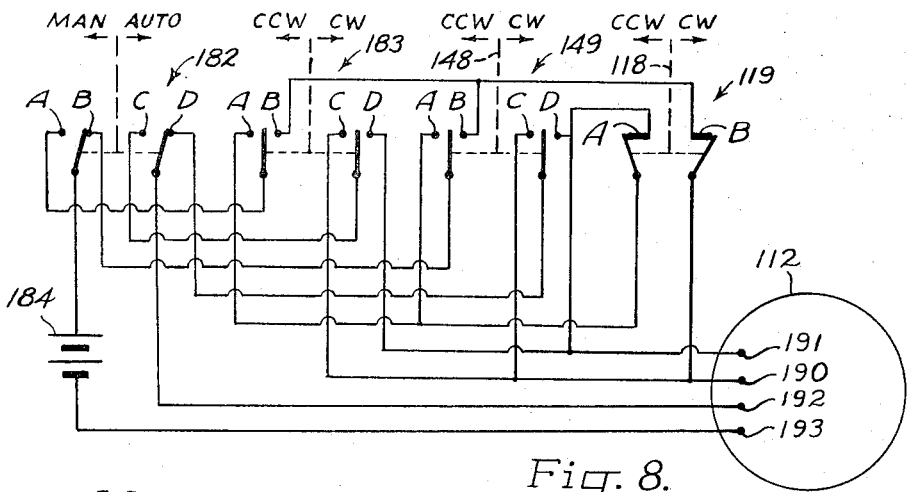
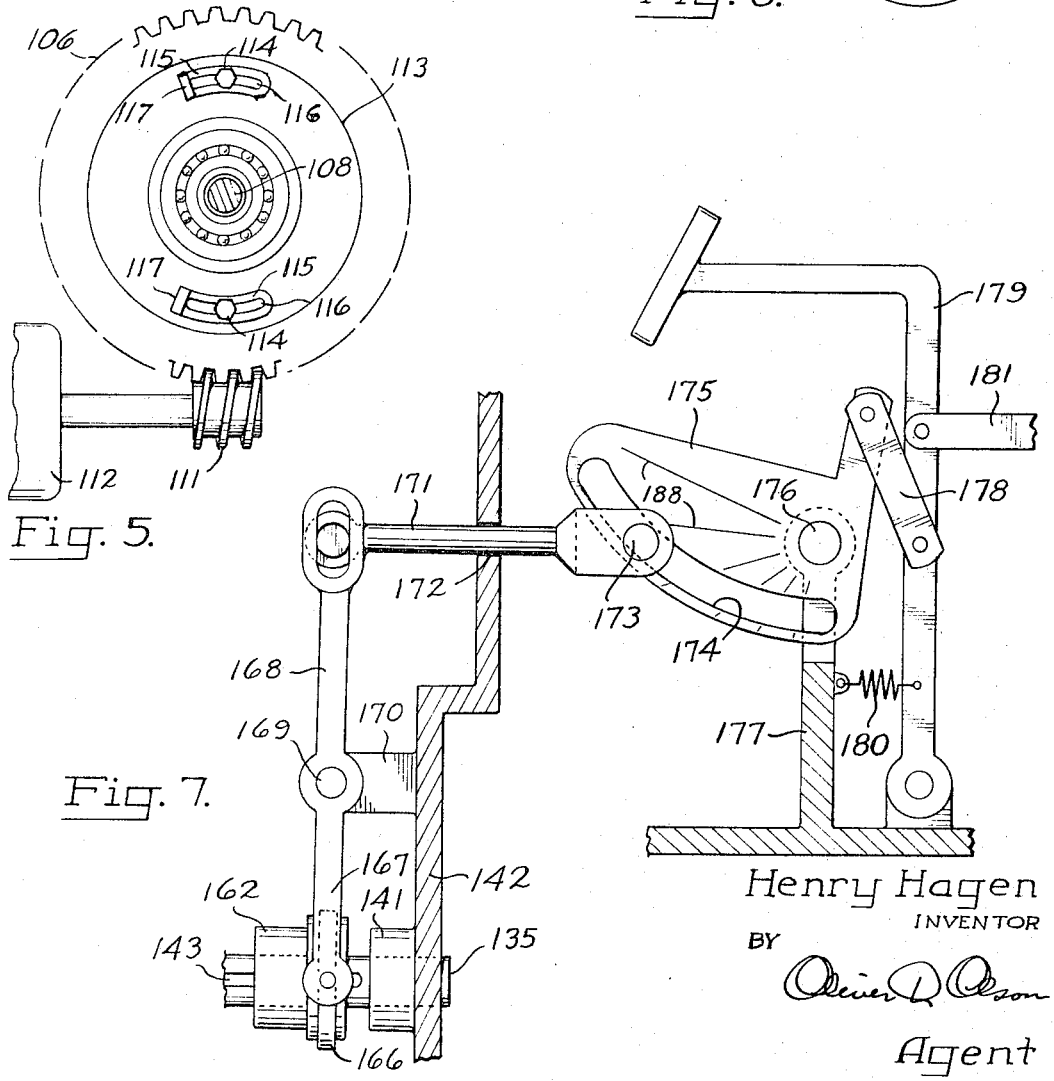

United States Patent Office 3,367,212
Patented Feb. 6, 1968

1

3,367,212
AUTOMATIC HYDRAULIC TRANSMISSION
Henry Hagen, 4445 Center St. NE.,
Salem, Oreg. 97301
Filed Feb. 2, 1966, Ser. No. 524,393
7 Claims. (Cl. 74—687)

This invention relates to automatic hydraulic transmissions, and has for its principal objective the provision of automatic means by which to achieve continuous and full utilization of the power output capability, at all throttle lever positions, of gasoline, diesel and other types of engines or power mechanisms which require transmissions or speed reducers for their operation, which automatic means represents an improvement in the hydraulic transmission disclosed in my earlier U.S. Letters Patent No. 2,354,456, issued July 25, 1944, both as to mode of operation and as to substantial reduction in the number of parts and corresponding reduction in cost of manufacture.

The foregoing and other objects and advantages of the present invention will appear from the following detailed description, taken in connection with the accompanying drawings in which:

FIG. 3 is a fragmentary view in side elevation of the remaining assembly of the automatic hydraulic transmission;

FIG. 4 is a fragmentary sectional view taken on the line 4—4 in FIG. 3;

FIG. 5 is a fragmentary sectional view taken on the line 5—5 in FIG. 3;

FIG. 6 is an end elevation as viewed on the line 6—6 in FIG. 3;

FIG. 7 is a fragmentary view in side elevation of the synchronizing mechanism and adjustment control of the governor component; and FIG. 8 is a schematic diagram of an electric control circuit for the mechanism disclosed in the preceding views.

Figure 1:
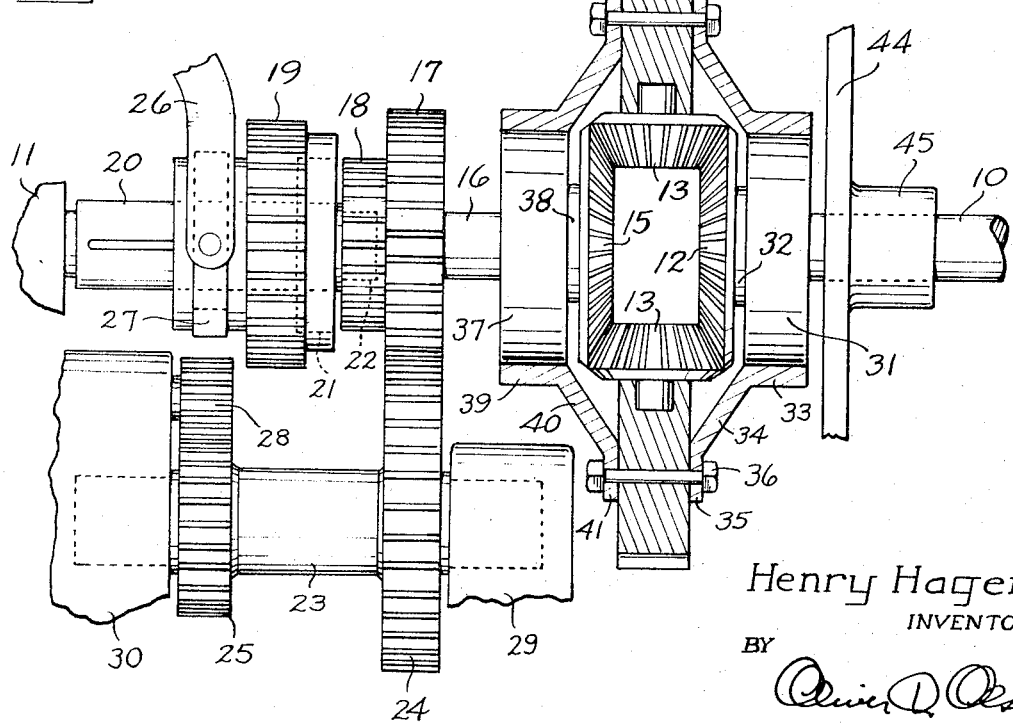
FIG. 1 is a fragmentary view in side elevation, with parts broken away to disclose details of internal construction, of the output assembly of a rotary drive mechanism having associated therewith a portion of the automatic hydraulic transmission embodying features of the present invention.

In FIGS. 1 and 3 of the drawings, the numeral 10 designates the drive shaft of an engine and the numeral 11 (FIG. 1) designates the driven shaft which is to be connected to the drive shaft 10 by means of the transmission presently to be described. It will be understood that the right hand end of the drive shaft 10 in FIG. 3 may be coupled to the output shaft of an engine through conventional coupling and clutch elements, as desired, and that the left hand end of the shaft 10 in FIG. 3 connects with the right hand end of said shaft in FIG. 1.

The shaft 10 has secured to the rear end thereof (FIG. 1) a bevel gear 12 which is in mesh with a plurality of radially arranged pinions 13 rotatably carried by a ring gear 14. The pinions constitute planetary gears, and they are in mesh with a bevel gear 15 confronting the gear 12. Gear 15 is secured to a stub shaft 16. The stub shaft has fixed to the rear end thereof a spur gear 17, which is formed in its rear portion with a clutch element 18. A spur gear 19 is mounted on the splined forward end portion 20 of the driven shaft 11, and it is formed in its forward face with a clutch element 21 engageable with the clutch element 18 so as to couple the two gears 17 and 19 together.

2

The forward end of the driven shaft 11 is formed with a reduced stub shaft 22, and an antifriction bearing is disposed about it within the clutch element 18. The clutch element 21 may be a toothed or socket clutch element engageable with the clutch element 18 so that when these clutch elements are in contact with each other, the two gears 17 and 19 will rotate as a unit. A jack shaft 23 is disposed in offset parallel relation with respect to the driven shaft 11, and it has secured thereto a pair of spaced apart gears 24 and 25 constituting reversing gears. The gear 19, when moved rearwardly by means of a shifting fork 26 engageable in a grooved collar 27 carried by the gear 19, is adapted to engage a gear 28 meshing with the gear 25 so that the driven shaft 11 will rotate reversely through the gear train 17, 24, 25, 28 and 19. The jack shaft 23 is rotatably supported by bearings 29 and 30 secured to suitable stationary supporting structure.

An anti-friction bearing member 31 is disposed about the hub 32 of the gear 12, and a cylindrical bearing section 33 of a front housing segment engages about the outer side of the anti-friction bearing. The front housing segment includes a substantially frusto-conical section 34 formed with an annular flange 35 secured by bolts 36 to the forward side of the ring gear 14. Similarly, an anti-friction bearing 37 is disposed about the hub 38 of the bevel gear 15 and engages within a cylindrical bearing section 39 of a rear housing segment. This segment includes a frusto-conical section 40 formed with an annular flange 41 which is secured by means of the bolts 36 to the rear side of the ring gear 14. The foregoing housing structure rotatably supports the ring gear 14 about the gears 12 and 15.

A crankshaft 42 is disposed in offset parallel relation with respect to the shaft 10, being rotatably supported in bearings 43 carried by spaced supporting structure 44 one of which also supports a bearing 45 for the shaft 10. The crankshaft has fixed thereto a spur gear or pinion 46 which is in constant mesh with the ring gear 14. The crankshaft supports plurality of cranks 47 each mounting a connecting rod 48. In the embodiment illustrated, there are three of these crank and connecting rod assemblies.

Figure 2:
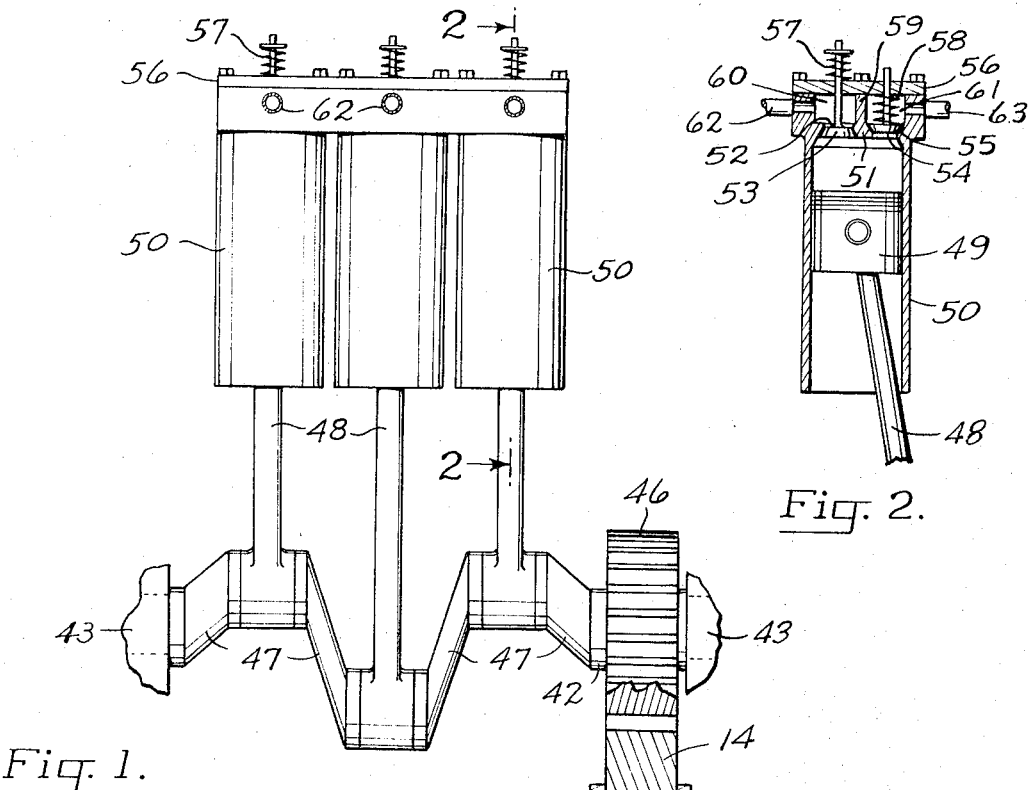
FIG. 2 is a fragmentary sectional view taken on the line 2—2 in FIG. 1.

The upper or outer end of each rod 48 has secured thereto a piston 49 (FIG. 2) which is slidable in a cylinder 50. The cylinder is formed with an inner wall or partition 51 having an intake port 52 normally maintained in a closed position by means of a spring-pressed intake valve 53. The partition is also formed with an outlet port 54 which is normally closed by a spring-pressed outlet valve 55. The cylinder is provided with an outer head 56 through which the stems of the valves 53 and 55 slidably extend. The valve 53 is constantly urged to a closed position by means of a spring 57, and the valve 55 is normally urged to a closed position by means of a spring 58.

A dividing wall 59 is carried by the partition 51, and it divides the space between the partition and the outer head 56 into an intake chamber 60 and an outlet chamber 61. The intake chamber has connected therewith an intake pipe 62, and the outlet chamber has connected therewith an outlet pipe 63.

The hydraulic fluid which is discharged from the cylinder 50 on the outward stroke of the piston 49 passes through the chamber 61 and through the exhaust or outlet pipe 63 into an intake chamber 64 formed in a pump control valve unit 65 (FIG. 3). The valve unit is divided horizontally into three sections by partitions 66 and 67. The top section, in turn, is divided by a wall 68 into air chambers 69 and 70. A vent 71 connects air chamber 69 and fluid intake chamber 64. Another vent 72 connects air chamber 70 with fluid outlet chamber 73. The cover plate 74 of the valve unit is provided with a filler cap 75 so that a predetermined level of fluid may be maintained in the unit. The lower partition 67 is formed with a valve port 76, which is normally closed by a spring-pressed valve 77. This valve is constantly urged to a closed position by spring 78, which is kept compressed by spring retainer 79 mounted around valve stem 80. The stem, in turn, is braced by a suitable guide 81 that allows the valve stem free vertical movement. The valve stem is formed with an integrally secured ratchet tooth 82 and partially rotatably latching tooth 83. The latching tooth is positioned in a slot 84 formed in valve stem 80 and it is mounted on pivot pin 85 for limited movement, receding inward from pressure applied to its rear slanted face. Spring 86 exerts constant pressure to keep tooth 83 in its normally extended latching position.

Pawl 87 is formed with a tooth 88 positioned to engage tooth 82 when pawl 87 is raised vertically. Pawl 87 is formed also with two slots 89 and 90 intersecting at right angles to each other. The larger slot 89 is parallel to and accepts latching pawl 91, which passes through the slot to engage tooth 83. The smaller slot 90 engages pin 92, which passes at right angles through the forward end of pawl 91 and is integrally secured to it. Slot 90 allows pawl 87 a limited vertical movement in the operation of valve 77. Pin 92, in addition to guiding the vertical movement of pawl 87, imparts a horizontal movement to the pawl when pawl 91 is moved rearwardly to release latch 83, or to allow tooth 88 to bypass ratchet tooth 82, as will be explained later.

Pawl 87 pivots on pin 93, which also secures the pawl to an arm 94 which is part of push rod 95. The push rod is guided vertically by suitable structural supports 96. The push rod is pressed downward by spring 97 against a spring retainer 98 to force a cam follower 99 into constant contact with cam 100. Cam 100 is fixed relative to shaft 101, and it is driven by gear 102, which is mounted on and keyed to a hub on shaft 101. Gear 102 is in constant mesh with gear 103, which, in turn, is keyed to a hub on shaft 10.

At the rear end of shaft 101 is mounted bevel gear 104, which is in mesh with a plurality of radially arranged pinions 105, rotatably carried by a ring gear 106. The pinions 105 constitute planetary gears and are in mesh with bevel gear 107 confronting the gear 104. Gear 107 is secured to shaft 108. Antifriction bearings 109 and 110 support shafts 101 and 108, respectively.

Ring gear 106 meshes with a worm gear 111 which is mounted on, and keyed to, the shaft of an electric motor 112. This motor may, for example, be a twelve volt, direct current, series wound motor operated off a twelve volt storage battery. The field and armature windings are brought out to external terminals on the motor frame. These terminals are connected by a multi-conductor cable to an electric voltage source and to a number of switches to form a motor control circuit shown schematically in FIGURE 8.

The frusto-cylindrical housing segments 113 are similar to the housing segments 34 and 40 previously described, and they rotatably support ring gear 106 about the gears 104 and 107. To the annular flanges of the front housing segment, and secured by bolts 114, are attached adjustable brackets 115 (FIG. 5). The brackets are adjustable around a limited arc by means of arcuate slots 116 formed into them along their center lines. Each bracket has formed into it, also, a stop lug 117 which extends rearward at right angles to the bracket, as shown in FIG. 3. These stop lugs 117 engage, from opposite directions with respect to the rotation of ring gear 106, the actuating lever (identified by the dotted line in FIG. 8) 118 of an electric switch 119 mounted on a structural support 120. Actuation of switch 119 opens the circuit to, and removes voltage from, the field and armature windings of motor 112.

Mounted on the rearward portion of shaft 108 and fixed relative thereto, is cam 121 (FIG. 6). One side of the raised portion of this cam is essentially perpendicular to the common axis of the cam and shaft. A portion of this perpendicular face is modified to form a curved surface 122, which, during rotation of the shaft, wipes the extension 123 of lever 124. This lever is suspended on a pivot pin 125 in a bifurcated support 126. The upper end of lever 124 is formed in a slotted fork 127 which engages pin 128 secured in the rearward portion of sliding pawl 91. Stop collar 130 is secured to pawl 91, and limits its forward movement urged by the pressure of spring 131 against the spring retainer collar 132 and retainer pin 133. Pawl 91 is guided by bearing support 134.

Shaft 101, at its forward end, and shaft 135, at its rear end, are jointed together for simultaneous rotation, as by means of a combination split journal and tooth or socket clutch assembly, at bearing 136 mounted in the supporting structure 137. Shaft 135 is journaled in bearing 138 for added support.

Shaft 135 drives a centrifugal motor controlling unit generally designated as 140. This unit, through motor 112, ring gear 106 and cam 121, has basic automatic control of valve 77, which, in turn, controls pump pistons 49 and, eventually, the rotation of ring gear 14, which provides the particular gear reduction for the proper relationship between the power available at the power source and the load prevailing at any particular moment.

Shaft 135, at its forward end, is journaled in a bearing 141, carried by a stationary support 142. Immediately behind its journaled end, the shaft is formed in a splined section 143.

A plate 144 is slidably mounted on a plurality of horizontally disposed and circumferentially spaced apart bolts 145, which are fixed at one end to support 137. On the upper portion of its rear face, the plate 144 supports a bracket 146 provided with a pair of horizontally spaced prongs 147. These prongs confine between them the switching lever 148 of automatic motor control switch 149. Referring to FIG. 8, movement of the switch lever 148 (indicated by the dotted line) in a forward direction (toward the right) closes the circuit to the field winding of motor 112 in such a way as to cause motor 112 to turn ring gear 106 in a clockwise direction. Conversely, movement of the switch lever in a rearward direction closes the circuit to the field winding of motor 112 in such a way as to cause the motor to turn the ring gear in the opposite, or counter-clockwise direction.

Stop collars 150 and 151 are slidably mounted on one of the standoff bolts 145, and they are secured to the bolts by set screws 152. The stop collars limit the range of movement of plate 144 to provide a means for adjustment of the contact pressure of the contacts in switch 149 for both the forward and rearward travel of switch actuating prongs 147.

The plate 144 is moved endwise by the centrifugal governor structure 140, which includes an annulus 153, formed with a grooved inner face 154. The periphery of the plate 144 is formed with a V-shaped edge 155 engaging within the grooved inner face 154, and ball bearings or anti-friction bearings 156 are interposed between the ring 153 and the periphery of the plate 144.

The ring 153 has fixed to the forward side thereof a plurality of forwardly extending ears 157 to which links 158 are pivotally connected. The links 158 are, in turn, pivotally connected as at 159 to links 160 which, at their forward ends, are pivotally connected as at 161 to a sliding collar 162. The collar is splined on the splined portion 143 of shaft 135. The links 158 and 160 form a toggle, and they are constantly urged inwardly by means of opposed springs 163, which are secured at their outer ends to ears 164, carried by the inner edges of the links 160. The springs 163 are secured also to ears 165 carried by collar 162.

The collar 162 has a groove rotatably retaining a shifting collar 166 with which a manually operable shifting fork 167 engages to effect adjustment of the governor mechanism 140. The fork 167 includes a lever 168 which is pivotally connected as at 169 to the bracket 170 mounted on support 142.

The lever 168 may be utilized directly, or through appropriate linkage, to manually adjust the sliding collar 162 and hence the governor linkages. However, in the preferred embodiment illustrated, a link or fork shifting member 171 is connected pivotally with the upper end of the lever 168, and is extended freely through an opening 172 in the support 142 for connection to means by which the operation of the device may be synchronized with the speed of the engine. Accordingly, the opposite end of the link 171 is pivotally connected to a pin or roller 173 movable within the cam track 174 formed in the cam plate 175. This plate is supported pivotally, at 176 on a frame member 177, and is connected through link 178 to the throttle lever or pedal 179. Spring 180 constantly urges the pedal rearwardly. A throttle link or rod 181 is connected at one end to an intermediate portion of the pedal and is coupled in conventional manner (not shown) to the engine carburetor.

Manual-Automatic Transfer Switch 182 and Manual Control Switch 183 are remotely located, for example on the dash panel of the vehicle. Their connections to the motor 112, battery 184 and their interconnection with the Automatic Motor Control Switch 149 and the Cam Rotation Limit Switch 119 are shown diagrammatically in FIG. 8.

Pin 185 is mounted removably in an opening in bearing 186 and may be used to engage a hole 187 when pawl 91 is pulled rearward manually into registry with the pin. Pin 185 and hole 187 are engaged in this manner when it is desired temporarily to deactivate valve 77 during a check of synchronization of control unit 140, for various other checks, or for maintenance procedures for which this device is useful.

Cam track 174 represents a locus traced by pin 173 on cam plate 175, when (1) the throttle lever 179 is operated over the full range of engine revolution rates; (2) a corresponding range of optimum torque loads are maintained on shaft 11; and (3) at each setting of the throttle lever 179, lever 168 is so inclined that the actuating lever 148 of the automatic motor control switch 149 is positioned midway between the two prongs 147 on bracket 146.

It is expected that the foregoing conditions will prevail with proper synchronization of cam track 174 with an engine speed control device, of which throttle link 181 is an example. Proper synchronization can be done empirically for a typical engine of a given type or specification by determining the locus of the cam track. One method of plotting an initial cam track on a blank cam plate 175 for a given engine type is as follows:

Remove pin or roller 173, place the manual-automatic transfer switch 182 in manual position, and insert pin 185 in opening 186 to secure the pawl 91 in retracted position. With a dynamometer coupled to output shaft 11 and a direct reading tachometer coupled to the engine or shaft 10, the engine then is operated at several carburetor throttle settings, for example near maximum, near idling and at several intermediate positions.

For each throttle setting there should be noted and recorded (1) the position or angle of the cam plate 175 with respect to the link 171 (angle lines 188 may be scribed on the plate); (2) the torque required to attain maximum power transfer to shaft 11, as indicated by the dynamometer, and also the maximum power attained (horsepower, watts, kilowatts, etc.); and (3) the engine tachometer reading at the moment when conditions in (2) are attained. Further, with each throttle setting, adjust the link 171 so that the actuating lever 148 of the automatic motor control switch 149 is located midway between the prongs 147 on the bracket 146. With each adjustment of the link 171, mark on the cam plate 175 the position of the hole for the roller 173. The circles defining the positions of said holes then are joined together with tangent curves to outline the slot for cutting the cam track 174.

A test run may be made by (1) coupling the link 171 to the cam plate 175 by extending the pin 173 through the cam track 174; (2) removing the pin 185 from the opening 187; and (3) placing the manual-automatic transfer switch 182 in the automatic position. The test is conducted by using the same throttle settings and dynamometer loads selected in the calibration run. At each selected throttle setting a recheck of torque load required for maximum power transfer to the shaft 11 and a recheck of the engine tachometer should agree closely with the results obtained in the calibration run.

In the use and operation of this transmission, the driving shaft 10 is connected to a suitable drive mechanism, and a driven shaft 11 is connected to a suitable driven structure. Assuming that a load is applied initially to the driven shaft 11 so as to oppose rotation of the shaft, the rotation of the drive shaft 10 and the gear 12 will cause the pinions 13 to rotate. Rotation of the pinions will effect rotation of the ring gear 14 which, in turn, will rotate the gear 46 and effect reciprocation of the pumping pistons 49.

The outward stroke of each piston will force the valve member 55 to an open position, and hydraulic fluid will flow from the outlet chamber 61, through the pipe 63 and into the pump control valve unit 65. At this time it is assumed that cam 100 has just lifted valve 77, so that the pawl 91 will maintain valve 77 momentarily in an open position. The fluid will pass through intake chamber 64, through port 76, through outlet chamber 73, out through pipe 62 into a pump intake chamber 60, through a port 52 and into a cylinder 50 whose piston 49 is on an intake stroke. It is important that the fluid flow circuit be designed to offer minimum impedance to the flow of fluid when valve 77 is open.

Some time after cam 100 has lifted valve 77, but before it has completed a whole revolution, the curved portion 122 of cam 121 will wipe extension 123 of lever 124, causing the extension to swing forward. Lever 124 will pivot on pin 125 and cause pin 128 to swing rearward, carrying with it pawl 91, which will unlatch ratchet tooth 83. With the unlatching of tooth 83, spring 78 will force valve 77 to close. When this valve closes, the fluid flow is stopped and pumps 50 can no longer operate, whereby pistons 49 hold cranks 47 and spur gear 46 stationary. Consequently, ring gear 14 also is held stationary, and the driving force on shaft 10 is transmitted to gear 15 through pinions 13 and gear 12 in a one-to-one ratio.

This latter condition will exist until cam 100, on its next cycle, raises push rod 95 and pawl 87. Pawl 87 engages ratchet tooth 82, raises valve stem 80 and, with it, valve 77. While the valve stem is rising, ratchet tooth 83 will recede forward into the valve stem under pressure from the forward end of pawl 91. When tooth 83 rises high enough to clear pawl 91, it is pushed rearward to latching position by spring 86. As cam 100 passes through its peak, push rod 95 lowers, no longer supporting pawl 87. Consequently, valve stem 80 then lowers to engage tooth 83 with pawl 91.

There is one set of conditions under which valve 77 does not open, and this will be explained later. At other times, within the period of one cycle or revolution of cam 100, valve 77 is open for a portion of the time and closed for the other portion. The percentage of one cycle that valve 77 remains open is a function of the position of cam 121 relative to that of cam 100.

The relative functional phase angle between the peak position of cam 100 under cam follower 99 and the wiping position of cam 121 on extension 123 can vary from essentially zero degrees to an angle a little short of 360 degrees, with the precise limits depending on cam and follower design. From the drawings it can be seen that the relative functional phase angle and the physical displacement angle do not necessarily have to agree. This, too, is a matter of design. The drawings show the cam 121 displaced from cam 100 by 90 degrees physically when their functional phase angle is zero.

The exception to the opening of valve 77 occurs when the functional phase difference between the two cams is essentially zero. When this relationship occurs, the cam surface 122 is advanced 180° from the position shown in FIG. 6. Reference to the drawings will show that just when cam 100 is rising to its peak, or zero degree position under follower 99, lever extension 123 is being wiped by cam surface 122. Then, following through the resulting component movement, it can be seen that tooth 88 is held away out of latching range of tooth 82. Consequently, under these conditions, valve stem 80 is not raised; there is no flow of fluid, no movement of pump pistons and no rotation of gear 14. Accordingly, the ratio of rates of rotation of gear 12 to gear 15 is unity.

The relative positions of cam 100 and cam 121, or their functional phase angle, are a function of the rotation of ring gear 106 by worm gear 111, which is driven in one direction or the other by motor 112 under the influence or guidance of the cam motor control circuit, shown in FIG. 8. In automatic operation, this is directed by control structure 140.

With ring gear 106 at rest, the drive for rotation of both cams 100 and 121 is obtained from shaft 10 through gears 103 and 102, shaft 101 and, for cam 121, through gears 104 and 107 through pinions 105 and shaft 108. Also, with ring gear 106 at rest, it can be seen that, although cams 100 and 121 turn in opposite directions, for a given angle of, for example, gear 102, their relative positions repeat at each revolution of gear 102.

However, with rotation of ring gear 106 by motor 112, cam 121 receives added drive, either positive or negative with respect to the drive from gear 102, depending on the direction of rotation of the motor. Consequently, for one revolution of cam 100, the ratio of "open time" to "closed time" of valve 77 depends on the variable position of cam 121 relative to the constant position of cam 100, assuming a given angle of gear 102 as a reference, as explained above.

Considering the explanation thus far, it becomes evident that shaft 11 receives its drive from shaft 10 in a series of short impulses when valve 77 closes, and that the pumps 50 and, resultantly, ring gear 14, are "free wheeling," with only irreducible friction losses for a load, when valve 77 opens. (The short impulses do not occur, of course, when cams 100 and 121 are in zero degree functional relationship.) However, the air chambers 69 and 70 are incorporated into the transmission to modify or to smooth out the impulses. When valve 77 closes, the elasticity of the air trapped in the chambers absorbs a certain amount of kinetic energy contained in the momentum of the moving components. This stored energy is released and applied to shaft 11 when valve 77 opens again. Consequently, in a graphical analysis, the steepness of the leading edge and the amplitude of each power pulse are decreased. Further, there is a decrease both in steepness and extent of decay of the trailing edge of each pulse. The result is a comparatively steady level of power applied to the load on shaft 11.

Resuming the discussion of the assumption of an initial load applied to shaft 11, it should also be assumed that the functional phase angle between cam 100 and cam 121 would be comparatively large, that is, valve 77 is open for a considerable portion of the cycle of cam 100. This would mean that ring gear 14 is rotating to raise the rotation ratios of shaft 10 to shaft 11 to values higher than unity, or about the equivalent of low gear ratios in a standard transmission. Since the load would be changing, the ratios also would be changing.

Shortly after the assumed initial load has been applied to shaft 11, the drive shaft 10 begins to increase in speed as the inertia of the load is being overcome. The controlling structure 140, including the governor for regulating the endwise movement of the plate 144, then will be operated, thereby swinging the governor links 158 and 160 outwardly against the tension of the retracting springs 163. Outward movement of the links moves the plate 144 in a forward direction toward stop 151.

This forward movement of plate 144 will cause bracket 146 to engage switch operating lever 148 of switch 149 and close contacts B and D (FIG. 8), thereby operating motor 112 to rotate ring gear 106 in a clockwise direction. Tracing the circuit in FIG. 8 for this operation, the positive terminal of the battery 184 is connected through contact B of switch 182, through contact B of switch 149, through contact B of switch 119, through the motor field terminal 190, out through motor field terminal 191, through contact D of switch 149, through contact D of switch 182, through motor armature terminal 192, out motor armature terminal 193, to the negative terminal of the battery.

Rotation of ring gear 106 in a clockwise direction brings cam face 122 closer to lever extension 123 with reference to the time that cam 100 opens valve 77, thereby shortening the "open time" of the valve. Now the rate of rotation of ring gear 14 is decreasing, and the rotation rate ratios of shaft 10 to 11 are approaching unity.

It is possible that the power-to-load relationship will become such that ring gear 106 will rotate to its limit in a clockwise direction, resulting in valve 77 remaining closed and the rotation ratio of shaft 10 to shaft 11 becoming unity. If gear 106 does rotate to its limit, stop lug 117 mounted on gear 106 will actuate switch lever 118 of cam rotation limit switch 119. Operation of this switch opens the battery voltage circuit to the motor field, thereby causing the motor to stop.

Since 180° of rotation of gear 106 causes 360° rotation of cam 121, limiting the rotation of gear 106 to 180° prevents cam 121 from "crossing over" its 360° range. This "cross over" would reverse the order of operation of the cams and, consequently, the order of the "open time" and "closed time" of valve 77.

Actuating lever 118 operates from either direction, depending on the direction of rotation of gear 106. Lugs 117 are mounted on flange 114 approximately 180° apart, their exact position being determined at the time of installation and tuneup by consideration of their functions in connection with related components, such as cams 100 and 121, pawl 91, etc.

As a typical proposed application of this transmission, it will be considered in connection with a gasoline engine.

It is believed to be at least generally true that the maximum power capability parameters of force, distance and time, for any given throttle lever setting, are fixed by design. That is, the quantity of $Fs/t$, wherein F is force, $s$ is distance and $t$ is time, for a given throttle lever setting is a constant; and its components, too, are fixed and, therefore, constants. This power quantity will be presumed to be present on shaft 10. The load on shaft 11, in terms of power, consists of a force $F'$, distance $s'$ and time $t$. Ideally, for maximum power utilization and efficiency, $F's'/t$ should equal $Fs/t$ at all times. However, $F'$ consists of inertia, gravity, several kinds of friction, and other components, each of which is fortuitous and normally variable and unpredictable. It is the function of the transmission to vary the distance $s'$ to maintain a reasonably close balance or equality between the engine power capability and the opposing power in the load. The time factor $t$ remains the same for each quantity. The transmission accomplishes its function by actuation from the governing structure 140. Small increments of change in force $F'$ are used by the governor structure to trigger required changes in distance $s'$ to establish or to main-main equality of $Fs/t$ and $F's'/t$.

The governor structure 140 is synchronized with the engine throttle lever setting through the sliding collar 162, the fork 167, the lever 168 and the fork shifting member 171 so that the plate 144 will be so positioned that switch actuating lever 148 of switch 149 will be midway between the prongs 147 on bracket 146 when the proper balance between engine power and the opposing load power has been attained.

The operation of the governor structure 140 is directly affected by two factors, namely the rotation rate of its drive shaft 135, and the position of sliding collar 162 on its splined shaft 143.

Consider a set of conditions as follows: With a given setting of the engine throttle lever through link 181, sliding collar 162 takes a corresponding position on the splined shaft 143. Accordingly, the balance between engine power output and the opposing load power is such that plate member 144 is situated so that switch lever 148 is midway between the prongs 147 on bracket 146. In other words, engine power and load power are in balance.

Now consider that the load is increased on shaft 11. The engine begins to slow down, the rotation rate of links 158 and 160 is decreased and the links are pulled in by springs 163. Plate member 144 is forced rearward and causes bracket 146 to actuate switch lever 148, thereby closing contacts A and C of switch 149. With the closing of these switch contacts, motor 112 rotates to cause worm gear 111 to rotate ring gear 106 in a counterclockwise direction, thereby increasing the "open time" of valve 77. With increased "open time," valve 77 allows pistons 49 to operate during a greater percentage of each cycle of cam 100, thereby allowing ring gear 14 to rotate at a higher rate. The higher rate of rotation of ring gear 14 increases the ratio of rate of rotation of shaft 10 to 11 with the rotation rate of shaft 10 decreasing only slightly. Decrease of the rate of rotation of shaft 11 has the effect of decreasing the distance factor $s'$ in the term $F's'/t$, which increased in value with the increase in load.

Motor 112 continues to rotate and thereby to continue to increase the ratio of the rate of rotation of shaft 10 to that of shaft 11 until the distance factor $s'$ reaches a value for which $F's'/t$ equals $Fs/t$. When this state of equilibrium is reached, the engine is no longer urged to decrease its rate of operation, the links 158 and 160 resume their former radius of travel, bracket 146 moves slightly forward until the switch lever 148 is midway between the prongs 147, voltage is removed from the motor field and armature windings, motor 112 stops, worm gear 111 stops rotating ring gear 106 (if it has not already been stopped by opening of cam rotation limit switch 119), the functional phase angle between cams 100 and 121 becomes stable, and ring gear 14 assumes a steady rate of rotation, thereby stabilizing the ratio of rotation rates of shaft 10 to shaft 11.

At this point, if the increase in load is assumed to have been substantial, some of the static inertia remains in the load increase and continues to diminish. As a result, the engine now will begin to increase its r.p.m., the links 158 and 160 will increase their peripheral radius and plate 144 will be pulled forward. The rear prong 147 of bracket 146 will pull switch lever 148 of switch 149 in a forward direction, closing contacts B and D of switch 149. The field and armature circuits of motor 112 thus will again be energized, but this time the polarity of the current in the field coils will be reversed, and worm gear 111 will cause ring gear 106 to rotate in a clockwise direction, thereby decreasing the functional phase angle of cams 100 and 121. The "closed time" of valve 77 will increase,
the pumping rate of pistons 49 will decrease, thereby slowing the rotation rate of ring gear 14, and the ratio of rotation rates of shaft 10 to shaft 11 will decrease.

Now, as the static inertia element in load force $F'$ disappears, the state of equilibrium between engine power output and the opposing load power is again attained through the following sequence of events: The tendency for the engine to increase its r.p.m. is removed, the links 158 and 160 resume their former radius, plate 144 moves rearward slightly until switch lever 148 is midway between the prongs 147 on bracket 146, closed contacts B and D of switch 149 will open, thereby de-energizing the field and armature windings of motor 112. Worm gear 111 and ring gear 106 stop rotating, the functional phase angle between cams 100 and 121 stabilizes, thereby stabilizing the pumping rate of pistons 49, the rotation rate of ring gear 14 and the rotation rates ratio of shafts 10 to 11. Engine power output, at full capability for the given throttle setting, $Fs/t$, is again in a state of equality with the opposing load power, $F's'/t$.

For another example of transmission operation, a fortuitous occurrence of a decrease in force $F'$ of the load can be considered. (Obviously, a change in $F'$ causes a change in $s'$ also, but since the initial change is in $F'$, it is this instantaneous change which is assumed to begin the action of the governing structure 140 to regulate the factor $s'$ to compensate for changes in $F'$.): The engine begins to raise its r.p.m., the rotation rate of links 158 and 160 increases, and centrifugal force increases their peripheral radius. Plate member 144 is pulled forward and causes the rear prong 147 of bracket 146 to move switch lever 148 forward, thereby closing switch contacts B and D of switch 149. With the closing of these switch contacts, motor field and armature windings of motor 112 are energized to cause worm gear 111 to turn ring gear 106 in a clockwise direction, thereby decreasing the functional phase angle between cams 100 and 121 and increasing the "closed time" of valve 77. The pumping rate of pistons 49 decreases, the rotation rate of ring gear 14 slows down, and the rotation rate ratios of shaft 10 to shaft 11 approach unity, thereby allowing the distance factor $s'$ to increase until $F's'$ of the load again equals the maximum power capability of the engine at the given throttle setting, $Fs/t$. Thus $Fs/t$ minus $F's'/t$ equals zero, indicating that all of the power capability of the engine at the given throttle setting is being used by a matching load power.

If the throttle lever setting of the engine carburetor is advanced by forward movement of pedal 179 and link 181, so as to increase the available power output capability of the engine, the sliding collar 162 is moved rearward to a new position on splined shaft 143. Moving rearward with collar 162 is the governing structure 140 including plate element 144, carrying with it bracket 146, the forward prong of which engages switch lever 148 of switch 149 and closes the associated contacts A and C. The operation of the transmission from this point is the same as that for the case of an increase in load, including the self-adjustment of the system to accommodate the comparatively gradual decline in the residual static inertia.

If the throttle lever is retarded from a previous relatively balanced condition by partial or complete release of pedal 179, the pedal is pulled rearward by tension in the spring 180. The rearward movement of the pedal takes with it link 181, which controls the throttle lever position. The pedal also moves link 171 rearward which, in turn, forces the upper portion of lever 168 rearward. The fork 167 thus pulls sliding collar 162 forward on its splined shaft 143. The controlling structure 140 is thus brought forward along with its plate element 144 and bracket 146 attached thereto. The rear prong 147 of bracket 146 engages switch lever 148 of switch 149, thereby closing contacts B and D. From this point, the operation of the transmission is the same as that for a decerase in load. In both of these examples, when the condition of matched engine and load power is reached, there remains some residual momentum, which, as it diminishes, acts as an increase in load to cause the transmission to react accordingly.

It will be apparent to those skilled in the art that various changes may be made in the number, size and arrangement of parts described hereinbefore. For example the plurality of pumps 49, 50 may be replaced by a single pump in which a piston reciprocates between closed ends which are interconnected through the valve assembly 64–77. In such instance, with valve 77 open, fluid will flow from the end of the cylinder toward which the piston is moving and will enter the opposite end of the cylinder. Thus, the opening at each end of the cylinder communicating with the valve assembly will constitute either an inlet opening or an outlet opening, depending upon the direction of movement of the piston. When the valve 77 is closed, the piston will be locked against movement in the cylinder, as will be understood.

Another illustration of change that may be made, is the replacement of the planetary gearing illustrated and described hereinbefore by any desired form of differential gearing. Another example of change that may be made is the omission of the cam follower elements 87–90 and 92–94. In this instance the cam follower push rod 95 is arranged to abut at its upper end with the lower end of the valve stem 80 to provide the function of the ratchet tooth 82 and pawl tooth 88.

The foregoing and other changes may be made without departing from the spirit of this invention and the scope of the appended claims.

Having now described my invention and the manner in which it may be used, what I claim as new and desire to secure by Letters Patent is:

1. In a drive system including an engine-powered drive shaft and an output driven shaft connected thereto through differential gearing, the combination therewith of
    (a) at least one reciprocative hydraulic pumping member each having a hydraulic fluid inlet and an outlet,
    (b) means connecting each pumping member to the differential gearing for operation thereby,
    (c) hydraulic valve means releasably sealing each pumping member outlet from each pumping member inlet,
    (d) valve-operating cam means operable by the drive shaft,
    (e) cam follower means interengaging the valve means and valve-operating cam means,
    (f) pawl means movable between a retracted position and an extended position wherein it engages the valve means releasably and holds the latter open,
    (g) pawl-operating cam means,
    (h) cam follower means interengaging the pawl-operating cam means and pawl means,
    (i) reversible electric control motor means having an electric circuit,
    (j) differential gearing means connecting the pawl-operating cam means simultaneously to the drive shaft and to the control motor means, and
    (k) electric switch means in the electric circuit of the control motor means and operable to control the direction of rotation of the control motor means for adjusting the relative angular relationship between the valve-operating cam means and the pawl-operating cam means.

2. The combination of claim 1 including electric switch means in electric circuit of the control motor means and operable by the differential gearing means to limit rotation of the motor means in both of its directions.

3. The combination of claim 1 including adjustable governor means engaging the electric switch means for automatic operation of the latter, and control means engaging the governor means for adjusting the latter.

4. The combination of claim 3 including manually operable electric switch means arranged selectively to bypass the governor-operated switch means.

5. The combination of claim 3 wherein the control means comprises a manually operable lever.

6. The combination of claim 5 including connecting means interconnecting the lever and the throttle operating means of the engine.

7. The combination of claim 6 wherein the connecting means includes synchronizing means for synchronizing operation of the governor means with the speed of the engine.

References Cited
UNITED STATES PATENTS 2,354,456 7/1944 Hagen _____ 74—687
2,890,604 6/1959 Campbell _____ 74—687 XR EDGAR W. GEOGHEGAN, *Primary Examiner.*